United States Patent
Rigny et al.

[11] Patent Number: 5,978,532
[45] Date of Patent: *Nov. 2, 1999

[54] SPECTROGRAPHIC MULTIPLEXER COMPONENT HAVING AN ARRAY OF WAVEGUIDES

[75] Inventors: Arnaud Rigny, Bagneux; Catherine Ramus, Vitry; Adrien Bruno, Palaiseau, all of France

[73] Assignee: France Telecom, France

[*] Notice: This patent issued on a continued prosecution application filed under 37 CFR 1.53(d), and is subject to the twenty year patent term provisions of 35 U.S.C. 154(a)(2).

[21] Appl. No.: 08/935,358
[22] Filed: Sep. 22, 1997

[30] Foreign Application Priority Data

Sep. 24, 1996 [FR] France ................. 96 11601

[51] Int. Cl.⁶ ............................................. G02B 6/34
[52] U.S. Cl. .................. 385/46; 385/37; 385/24; 385/39
[58] Field of Search ................... 385/46, 39–50

[56] References Cited

U.S. PATENT DOCUMENTS 5,341,444  8/1994  Henry et al. ........................ 385/11
5,467,418  11/1995  Dragone ............................. 385/37
5,629,991  5/1997  Dragone ............................. 385/11

FOREIGN PATENT DOCUMENTS

WO-95 22070  2/1995  WIPO ........................ G02B 6/34

OTHER PUBLICATIONS

IEEE Photonics Technology Letters, vol. 7, No. 9, Sep. 1, 1995, pp. 1034–1036.

IEEE Photonics Technology Letters, vol. 5, No. 6, Jun. 1, 1993, pp. 707–709.

*Primary Examiner*—Rodney Bovernick
*Assistant Examiner*—Ellen E. Kang
*Attorney, Agent, or Firm*—Blakely Sokoloff Taylor & Zafman

[57] ABSTRACT

A spectrographic type multiplexer and/or demultiplexer optical component having an array of waveguides, the component comprising a star inlet coupler and a star outlet coupler with said array extending therebetween, and also comprising an inlet light guide and an outlet light guide for said inlet and outlet couplers, respectively, wherein the spectrum response of the component is the sum of two substantially Gaussian spectrum responses of peaks that are offset in wavelength.

6 Claims, 4 Drawing Sheets

2D MODE OF THE STRUCTURE

SPECTROGRAPHIC MULTIPLEXER COMPONENT HAVING AN ARRAY OF WAVEGUIDES

The present invention relates to a spectrographic type multiplexer and/or demultiplexer type component having an array of waveguides (also known as a "phasar" in the terminology commonly used by the person skilled in the art).

BACKGROUND OF THE INVENTION

Spectrographic multiplexers having an array of waveguides conventionally comprise a dispersive array of light guides connected to inlet and outlet waveguides via two star couplers. The field in an inlet waveguide is reproduced in the plane of the outlet waveguides when the optical path length difference between two adjacent waveguides in the array is equal to an integer number of incoming wavelengths. Varying wavelength causes the distribution of the field over the outlet waveguides to be moved in translation. Such a configuration thus serves to separate different wavelengths in space.

By way of example, such components are used as a 1 to N demultiplexer, as an N to 1 multiplexer, or as an N to N multiplexer with switching.

A particularly advantageous application for such components lies in the field of optical fiber telecommunications, for example with high rate transmission (e.g. in a receiver circuit), or in optical distribution networks (wavelength separator), or in optical switching devices (highly integrated high speed electronic "chips" or between computers or within a computer).

As a general rule, the spectrum response obtained in an outlet waveguide from such a component corresponds to coupling a Gaussian beam into a Gaussian waveguide, and is thus itself Gaussian.

However, a Gaussian spectrum response requires accurate control over emitted wavelengths, thus making it difficult to use in a system. Unfortunately, the existence of small fluctuations in the wavelength at which a laser emits (fluctuations due to temperature) makes it necessary to be able to use channels having broader spectrum responses (or to servo-control the laser, which is difficult to do and expensive).

Broadening the spectrum response also makes polarization independence easier to achieve. The shape of waveguides is highly critical in obtaining polarization independence (whatever method is used). Thus, by having a flat spectrum response, the power received over a channel is independent of polarization, even if its TE and TM peaks are slightly offset (offset due to shape being slightly inaccurate).

Several techniques have already been proposed for making a spectrograph having an array of waveguides that presents a square type spectrum response.

In particular proposals have been made in: "Phased-array wavelength demultiplexer with a flattened wavelength response", University of Delft, M. R. Amersfoort, et al., IEEE Electronic Letters, February 1995, Vol. 30, No. 4; and "Polarization-independent InP-based phased-array wavelength demultiplexer with a flattened wavelength response", University of Delft, L. H. Spiekman et al., ECOC 94; to enlarge the outlet waveguides so as to obtain truly multimode outlet waveguides. Such multimode waveguides can couple with the incident beam over a broader range of wavelengths.

However, such multimode waveguides do not enable the outlet of such a spectrograph having an array of waveguides to be coupled to other elements such as another phasar, an optical amplifier, etc.

The very poor coupling between a multimode waveguide and a monomode fiber makes such a component unusable in monomode fiber networks.

Such spectrographs can be used only with photodiodes disposed at the outlet from the multimode waveguides in order to detect output powers.

Proposals have also been made in "Arrayed-waveguide grating multiplexer with a flat spectral response" NTT, K. Okamoto and H. Yamada, Optics Letters, January 1995, Vol. 20, No. 1, to achieve a "(sinx)/x" type power distribution in the array by modifying both the power distribution at the inlet to the waveguide array and the phase shifts of the waveguides in the array.

No practical embodiments have yet been achieved using that structure, for the following reasons: secondary power lobes are obtained in the array, making it necessary firstly to modify the mode shape in the inlet guide, which shape must be square, and secondly to provide additional phase shifting on the waveguides which correspond to the secondary lobes.

It will be understood that such a technique which involves modifying the inlet power shape and the phase shifting in the array of waveguides is difficult to implement, with poor control over manufacturing parameters giving rise very quickly to degraded component performance.

In particular, the phase shifting corresponding to the secondary lobes must be accurately controlled, since a positioning error on a waveguide concerning the additional phase shifting degrades the spectrum response very greatly and makes the phasar unusable.

OBJECTS AND SUMMARY OF THE INVENTION

The object of the invention is to obtain a spectrographic multiplexer and/or demultiplexer having an array of waveguides which presents a square spectrum response and which does not present the above-mentioned technical drawbacks.

Proposals have already been made in U.S. Pat. No. 5,467,418 for an optical device having an array of waveguides that makes it possible to reduce the value of the ratio S/Wo (outlet channel spacing divided by the passband width of the transmission coefficients).

The invention provides a spectrographic type multiplexer and/or demultiplexer optical component having an array of waveguides, the component comprising a star inlet coupler and a star outlet coupler with said array extending therebetween, and also comprising an inlet light guide and an outlet light guide for said inlet and outlet couplers, respectively, wherein the spectrum response of the component is the sum of two substantially Gaussian spectrum responses of peaks that are offset.

In particular, in an advantageous embodiment, between the inlet coupler and the outlet coupler, the coupler includes at least two waveguide arrays of different pitches.

In another embodiment, it includes means for providing different polarization compensation in at least two groups of waveguides in the array, corresponding to two spectrum response peaks that are offset.

In another variant, at least an inlet waveguide of the inlet coupler or an outlet waveguide of the outlet coupler is etched in such a manner that said waveguide, while remaining monomode, presents a two-peak mode shape.

Such components present spectrum responses that are substantially square. They make it possible to be insensitive to fluctuations in the emission lasers and they lend themselves to integration with other components.

BRIEF DESCRIPTION OF THE DRAWINGS

Other characteristics and advantages of the invention appear further from the following description. The description is purely illustrative and non-limiting. It should be read with reference to the accompanying drawings, in which.

MORE DETAILED DESCRIPTION

Figure 1:
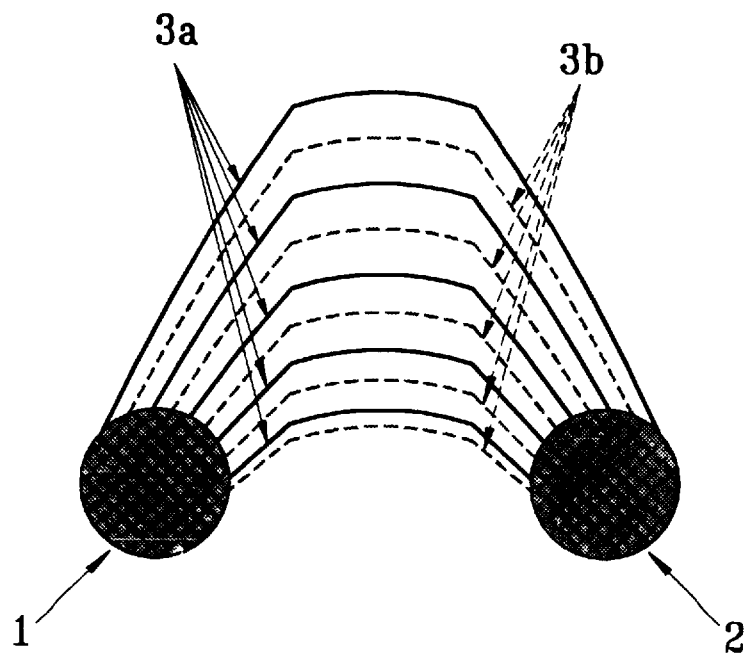
FIG. 1 is a diagram showing a first possible embodiment of the invention.

The device shown in FIG. 1 comprises a star type inlet coupler 1, an outlet coupler 2 that is also of star type, and two arrays of waveguides 3a and 3b extending between the two couplers 1 and 2. It also includes an inlet waveguide and an outlet waveguide, neither of which is shown in FIG. 1.

In the example shown in FIG. 1, the two arrays of waveguides 3a and 3b are interleaved with each other, waveguides of the array 3a alternating with waveguides of the array 3b.

The two arrays 3a and 3b are selected so that their spectrum responses are offset in wavelength, with the difference between the peaks of the two Gaussian spectrum responses generated in this way being selected so that a square type spectrum response is obtained when the spectrum responses of the two arrays 3a and 3b are added together.

By appropriately selecting this offset between the two Gaussian responses, it is possible to broaden the spectrum response so as to make it more than three times as wide as the Gaussian response of either one of the arrays.

An array is characterized by the wavelength difference between any two adjacent waveguides making it up.

The wavelength difference between two adjacent guides in the first array is written $\Delta L_1$, while the wavelength difference between two adjacent waveguides in the second array is written $\Delta L_2$.

The wavelengths $\lambda_1$ and $\lambda_2$ at which the incident beam couples with the central outlet waveguide are given in the following table.

| | Array 1 | Array 2 |
|---|---|---|
| Wavelength difference between two adjacent guides | $\Delta L_1 = \Delta L - \frac{1}{2}\delta\iota$ | $\Delta L_2 = \Delta L - \frac{1}{2}\delta\iota$ |
| Wavelength at which the incident beam couples with the central outlet waveguide | $\lambda_1 = \dfrac{n_{C1}\left(\Delta L - \frac{1}{2}\delta\iota\right)}{m}$ $= \lambda_0 - \dfrac{n_{C1}\delta\iota}{2m}$ | $\lambda_2 = \dfrac{n_{C2}\left(\Delta L - \frac{1}{2}\delta\iota\right)}{m}$ $= \lambda_0 - \dfrac{n_{C2}\delta\iota}{2m}$ | where $n_{c1}$, is the effective refractive index of the waveguides in array 1, $n_{c2}$ is that of array 2, m is the order of common interference of the two arrays, $\Delta L$ is the mean of $\Delta L_1$ and $\Delta L_2$, and $\delta l$ is the difference between $\Delta L_1$, and $\Delta L_2$.

For example, if the waveguides of the two arrays are identical, then the resulting spectrum response is centered on:

$$\lambda_0 = n_c \Delta L/m$$

and is formed by two peaks spaced apart in wavelength as follows:

$$\delta\lambda = n_c \delta\iota/m$$

Figure 2:
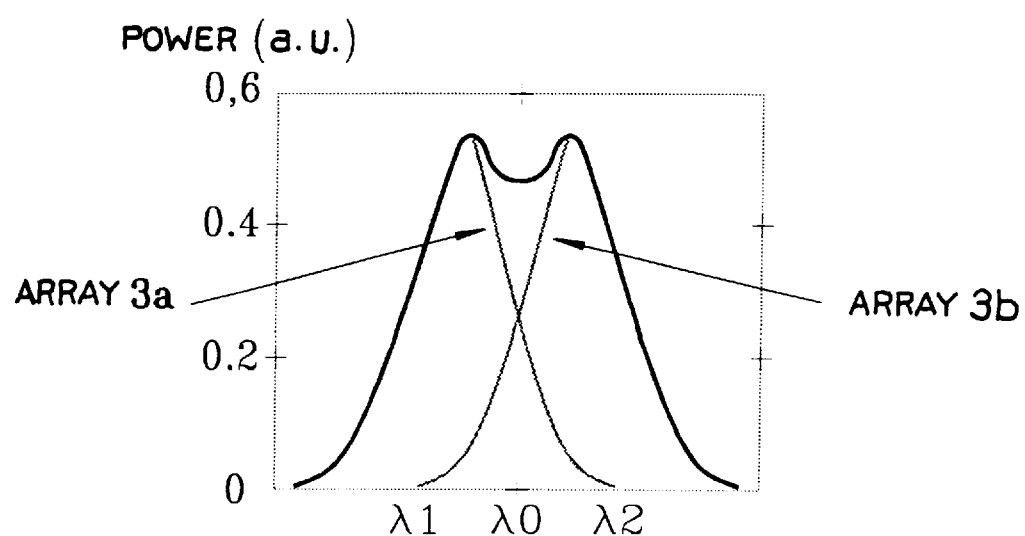
FIG. 2 shows the spectrum response obtained with the embodiment of FIG. 1.

A spectrum response obtained in this way is shown in bold in FIG. 2, which also shows in dotted lines the two Gaussian spectrum responses which together make up the spectrum response shown.

Naturally configurations other than the interleaved array configuration shown in FIG. 2 can be envisaged. In particular, the two arrays may extend between the two couplers 1 and 2 while being situated in two different zones.

Likewise, any geometrical shape may be envisaged for the arrays 3a and 3b.

In addition, it is advantageous for the two arrays 3a and 3b to be implemented so that each is separately independent of polarization.

This can be done using techniques conventionally known to the person skilled in the art (waveguides that are not birefringent, using a half-wave plate, using an integrated polarization converter, compensating the birefringence in the sheet, etc . . . ).

By way of example, it is possible to use the birefringence-compensating techniques described, in particular, in French patents FR 95 03945 and FR 95 04031, the teaching of which is included herein by reference, applying them independently to each array.

In one of those techniques, polarization rotators are disposed on the path of the light in each of the light guides to make the optical path length travelled respectively by the TE and the TM polarization modes equal.

In another of those techniques, each of the light guides of an array is constituted by at least two portions corresponding to two different types of birefringence. One of the portions has normal type birefringence, while the other constitutes a compensation portion.

The pitch $\Delta L$ of the light guide array and the wavelength difference $\Delta\iota$ of the compensation portion between two adjacent waveguides are selected so as to obtain zero overall compensation.

Figure 3:
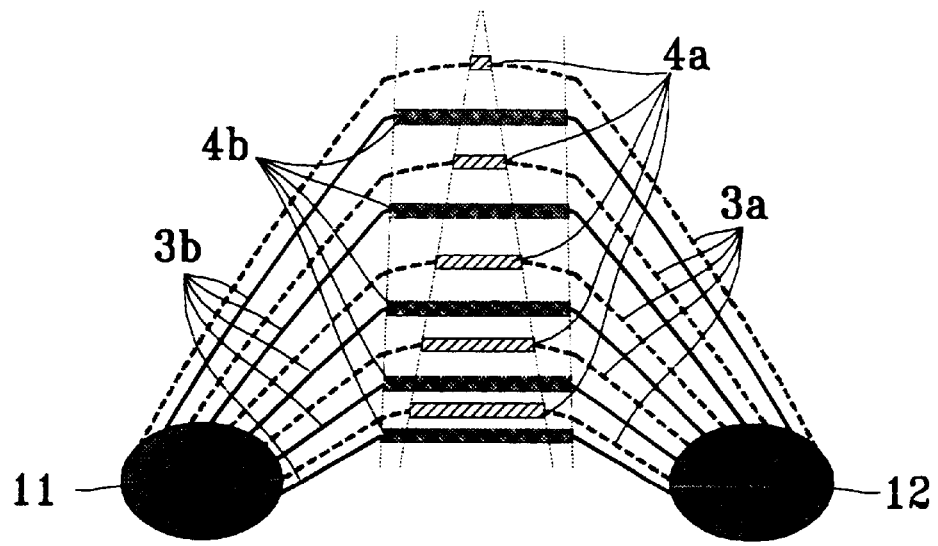
FIG. 3 shows a possible variant for the embodiment of FIG. 1.

In the variant shown in FIG. 3, compensation of this type is applied independently to array 3a and to array 3b. The compensation portions of array 3a are referenced 4a and those of array 3b are referenced 4b.

Figure 4:
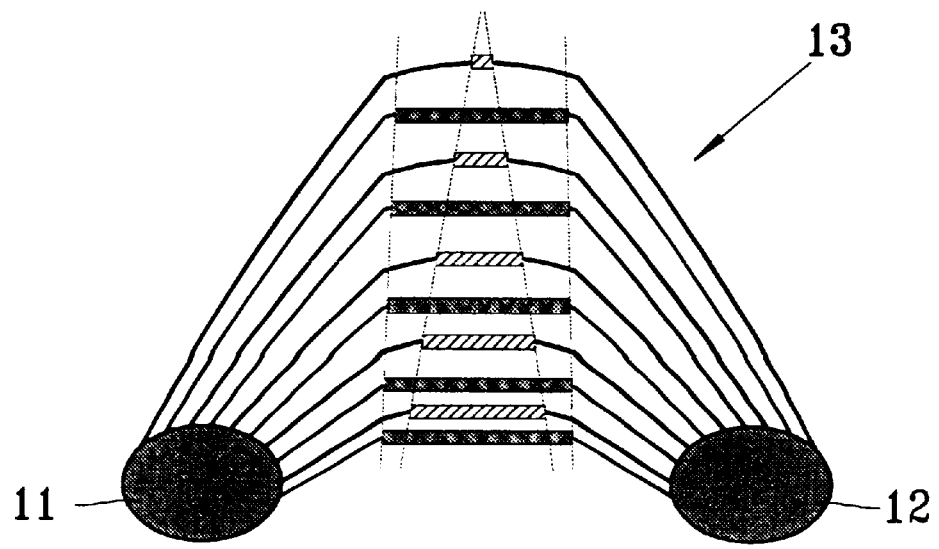
FIG. 4 shows another possible embodiment of the invention.

With reference now to FIG. 4, another possible embodiment of the invention is shown.

Two different compensations are applied to two subsets of waveguides in the same array 13 between two star couplers 11 and 12, so as to generate two peaks which combine so as to define a square spectrum response for said array 13.

For example, the compensation portions and the normal portions are of the same type from one waveguide to another, with the lengths of the compensation portions of two adjacent waveguides being such that the two adjacent waveguides corresponding to two different compensations.

With ΔL being the difference in length between two adjacent waveguides, and with Δι1 and Δι2 being the wavelength differences between compensation portions of one and the other of the two compensations, the wavelengths $\lambda_1$ and $\lambda_2$ corresponding to the peaks generated in this way for TE and TM modes are given by:

|  | subarray 1 | subarray 2 |
| --- | --- | --- |
|  | TE | |
| Length difference | Δι1 | Δι2 |
| Peak positions | $\lambda_1 = \frac{n_{1TE}\Delta L}{m} + \frac{(n_{2TE} - n_{1TE})\Delta\iota 1}{m}$ | $\lambda_2 = \frac{n_{1TE}\Delta L}{m} + \frac{(n_{2TE} - n_{1TE})\Delta\iota 2}{m}$ |
|  | TM | |
| Length difference | Δι1 | Δι2 |
| Peak positions | $\lambda_1 = \frac{n_{1TM}\Delta L}{m} + \frac{(n_{2TM} - n_{1TM})\Delta\iota 1}{m}$ | $\lambda_2 = \frac{n_{1TM}\Delta L}{m} + \frac{(n_{2TM} - n_{1TE})\Delta\iota 2}{m}$ | where $n_{1TE}$ and $n_{2TE}$, $n_{1TM}$ and $n_{2TM}$ are the effective indices of the normal portions and of the compensation portions respectively for TE mode and for TM mode.

Δι1 and Δι2 are selected so that the wavelengths $\lambda_1$ and $\lambda_2$ are the same for TE mode and for TM mode. The spectrum response is then similar to that shown in FIG. 2.

In the embodiment of FIG. 1 and in the embodiment of FIG. 3, the waveguides of the array may have the following epitaxially-grown structure, for example:

| Material | Thickness |
| --- | --- |
| InP | 0.6 μm |
| Q (1.3 μm) | 0.3 μm |
| InP | 0.55 μm |
| Q (1.3 μm) | 0.05 μm |
| InP | 0.55 μm |
| Q (1.3 μm) | 0.05 μm |
| InP | 0.55 μm |
| Q (1.3 μm) | 0.05 μm |
| InP | substrate | where Q is a quaternary material such as an InGaAsP material.

In this embodiment, the guiding portion of the inlet waveguide(s) of the inlet coupler or of the outlet waveguide(s) of the outlet coupler is/are etched so that while remaining monomode, a mode shape is achieved that has two peaks (treated as though they are Gaussian shapes).

Figure 5:
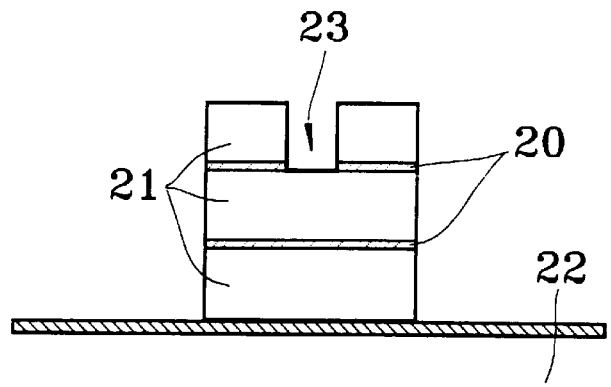
FIG. 5 is a diagrammatic section view of an inlet or outlet waveguide in another possible embodiment of the invention.
Figure 5:
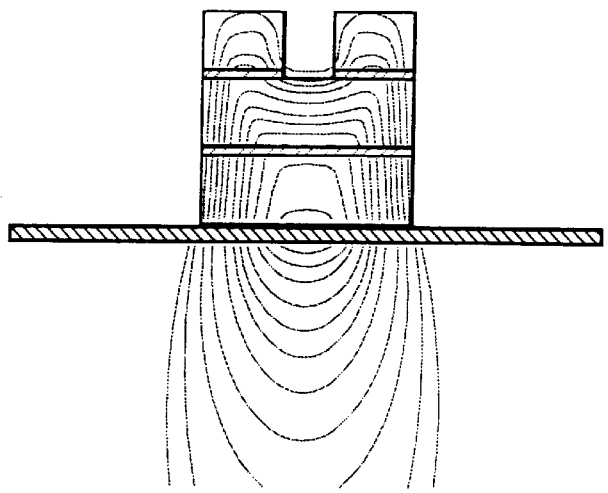

The waveguide structure shown in FIG. 5 includes two layers referenced 20 that are absorbent at a wavelength of 1.3 μm (e.g. 0.05 μm thick layers of InGaAsP) located between a bottom InP layer, a top InP layer, and an intermediate InP layer, these three layers, all referenced 21 in FIG. 5, being 0.55 μm thick and deposited on a substrate 22.

The etching, referenced 23, is performed in the top InP layer 21 and in the adjacent guiding layer 20.

Figure 6:
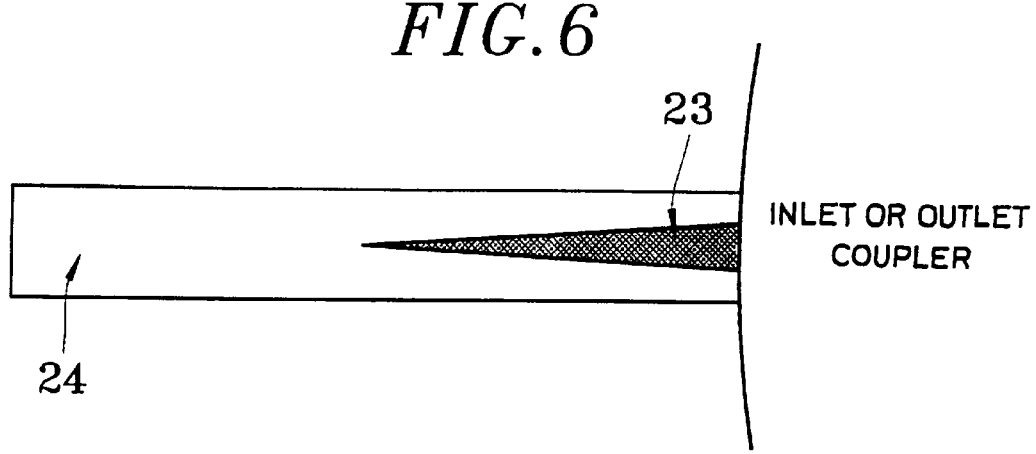
FIG. 6 is a diagrammatic plan view of the FIG. 5 waveguide.

Naturally, and as shown in FIG. 6, this etching 23 is not performed over the entire length of the inlet or outlet waveguide 24, but only over a transition zone in the immediate vicinity of the corresponding coupler.

The width of the ribbon defined by the guiding layers is 5 μm, and the width of the etching in the immediate vicinity of the corresponding coupler is 1 μm.

Figure 7A:
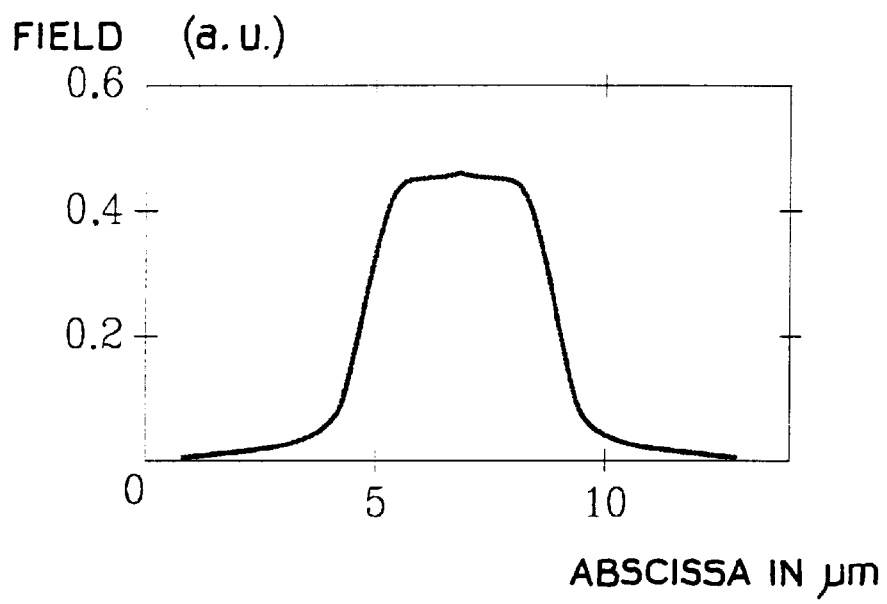
FIG. 7a shows a square lateral mode of an inlet or an outlet fiber obtained using the embodiment of FIG. 5.

This structure makes it possible to obtain a square lateral mode of the type shown in FIG. 7a.

Figure 7B:
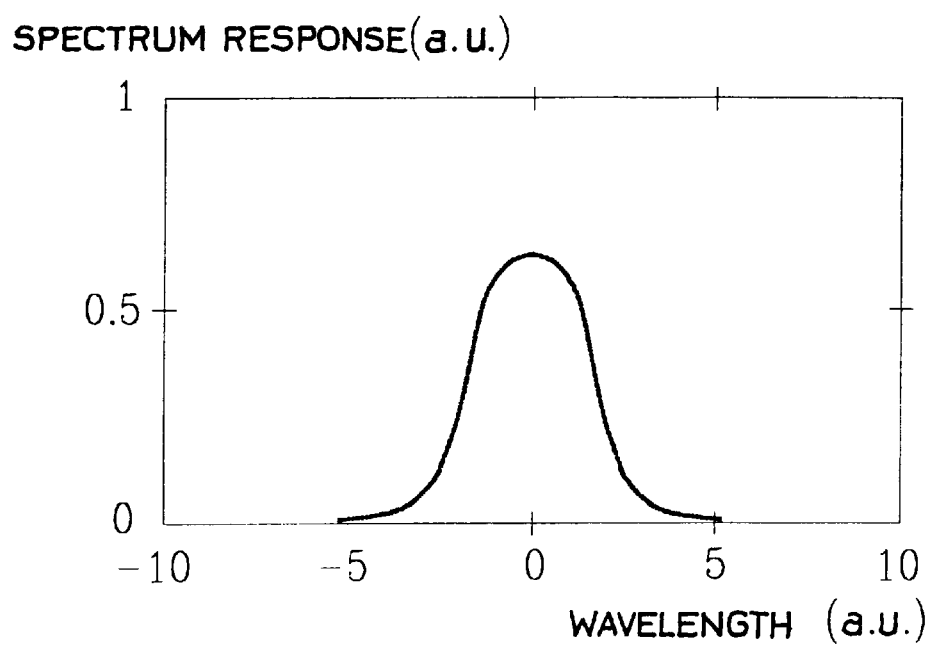
FIG. 7b shows the spectrum response obtained using the embodiment of FIG. 5.

The spectrum response then obtained, which is the convolution of said square mode with a narrower Gaussian mode (same three-layer waveguide, but 3 μm thick), is then itself square, as shown in FIG. 7b.

It is recalled that spectrum response is the convolution of the inlet waveguide mode and the outlet waveguide mode, with the roles of the inlet waveguide and of the outlet waveguide being interchangeable.

FIG. 7b shows the spectrum response obtained with a waveguide of mode width equal to 1.6 μm (at 1/e).

In this embodiment, polarization compensation is implemented in the same manner as for the embodiments of the preceding figures.

We claim:

1. A spectrographic type multiplexer and/or demultiplexer optical component having an array of waveguides in which the difference in length between two adjacent waveguides is constant, the component comprising a star inlet coupler and a star outlet coupler with said array extending therebetween and also comprising an inlet light guide and an outlet light guide for said inlet and outlet couplers, respectively, wherein said component comprises at least a second array of waveguides in which the difference in two adjacent waveguides is constant, the difference in lengths between the adjacent waveguides of one array being different from the difference in length between the adjacent waveguides of the other array, the spectrum response of the component is the sum of two substantially Gaussian spectrum responses of peaks that are offset in wavelength.

2. A component according to claim 1, wherein the guides of the arrays are interleaved with one another across the width of the arrays.

3. A component according to claim 1, including means for providing different polarization compensation in at least two groups of waveguides in the array, corresponding to two spectrum response peaks that are offset in wavelength.

4. A component according to claim 3, wherein the means for providing different polarization compensation comprise compensation portions in the waveguides of the array(ies) of birefringence and length such that the overall birefringence of the waveguides is substantially zero.

5. A component according to claim 3, wherein the compensation means comprise compensation portions in the waveguides of the array(ies) of birefringence and length such that the overall birefringence of the waveguides is substantially zero, and wherein the differences in length of the compensation portion between two successive waveguides of each of the two groups of guides of the array are such that:

$$n_{1TE}\Delta L+(n_{2TE}-n_{1TE})\Delta\iota 1=n_{1TM}\Delta L+(n_{2TM}-n_{1TM})\Delta\iota 1$$

$$n_{1TE}\Delta L+(n_{2TE}-n_{1TE})\Delta\iota 2=n_{1TM}\Delta L+(n_{2TM}-n_{1TM})\Delta\iota 2$$

where $n_{1TE}$ and $n_{2TE}$, $n_{1TM}$ and $n_{2TM}$ are the effective refractive indices of the normal portions and of the compensation portions respectively for TE mode and for TM mode, $\Delta\iota$ being the difference in length between two adjacent guides, $\Delta\iota 1$ and $\Delta\iota 2$ being the differences in length between compensation portions in each of the two compensations.

6. A component according to claim 1, wherein at least one inlet waveguide of the inlet coupler or outlet waveguide of the outlet coupler is etched in such a manner that said waveguide remaining monomode has a two-peak mode shape.

* * * * *

UNITED STATES PATENT AND TRADEMARK OFFICE
CERTIFICATE OF CORRECTION

PATENT NO. : 5,978,532
DATED : November 2, 1999
INVENTOR(S) : Rigny et al.

It is certified that error appears in the above-identified patent and that said Letters Patent is hereby corrected as shown below:

In column 3, line 53, delete "The wavelength" and insert -- The length -- .

In column 3, line 54, delete "the wavelength" and insert -- the length -- .

In column 3, line 57, delete "The wavelengths" and insert -- The lengths -- .

In column 4, line 2 (within Table 1), delete "Wavelength" and insert -- Length -- .

In column 4, line 53, delete "the wavelength" and insert -- the length -- .

In column 5, line 13, delete "the wavelength" and insert -- the length -- .

Signed and Sealed this

Twentieth Day of March, 2001

Attest:

NICHOLAS P. GODICI

*Attesting Officer*   *Acting Director of the United States Patent and Trademark Office*